Feb. 27, 1962 E. F. COUSINO ET AL 3,022,712
SHOCK ABSORBING STRUCTURE
Original Filed Oct. 28, 1952

ELWIN F. COUSINO,
ROLLEN E. BROWN,
INVENTORS.

BY
ATTORNEY.

3,022,712
SHOCK ABSORBING STRUCTURE
Elwin F. Cousino, Los Angeles, Calif., and Rollen E. Brown, Englewood, Colo., assignors to Southern Chemicals, Incorporated, a corporation of Louisiana
Continuation of application Ser. No. 317,338, Oct. 28, 1952. This application Jan. 3, 1957, Ser. No. 632,377
5 Claims. (Cl. 94—7)

This invention relates to a cushion-like device, and more particularly to protective layers of materials for use in place of or on hard surfaces to prevent injury to persons or damage to things tending to come into violent contact with them.

This invention will of course have a large scope of applications; however, it has been found especially useful when employed as a cushion-like layer under playground apparatus for the physical safety of children playing thereon.

To the present time, only an elastic cushion has generally been provided for the above-described purpose. Such an elastic cushion generally recovers its shape substantially instantaneously after having been deformed by the impact of a body thereagainst. This means that persons or things coming into violent contact with such a cushion will generally be subjected to rather large rebound forces and that such a cushion may therefore actually provide very little in the way of protection, e.g. for school children falling from playground apparatus.

It is therefore an object of the invention to provide a structure for absorbing rather than merely storing the kinetic energy of a body coming into violent contact therewith.

The present invention achieves this and other objects of the invention and overcomes the above-described disadvantage of the prior art by providing a membrane at least partially defining an enclosed space, a mass of rubber-like particles in the space, and a tacky material covering each individual particle, the particles being bound together only by the tackiness at their external surfaces, this tackiness providing a yielding bond between adjacent particles for controlling the resiliency of the structure by lengthening the time required for the structure to recover its shape after having been deformed by the impact of the body thereagainst, the individual particles because of their resiliency tending to resume their original form and thereby slowly overcoming adhesion to neighboring particles, whereby the structure may slowly and at least partially recover its shape without causing said body to rebound.

The invention thus includes the combination of two structures, a membrane to provide an enclosed space and tacky rubber-like particles in the space. Each element in the combination of these two structures is necessary to control the resilience of the rubber-like particles, this desirable property causing the structure to actually absorb the kinetic energy of a body coming into contact with it.

In the first place, it is necessary to employ tacky rubber particles to produce the above-described controlled resilience of the elastic character of the individual particles, although this physical property of the entire shock absorbing structure is substantially different than the elastic nature of the rubber particles individually. Thus, in order to produce this controlled resilience, rubber-like or resilient particles must be employed and they must be tacky.

Tacky rubber particles may be produced by any one of a number of conventional reclaiming processes, the invention residing in the combination of a membrane and tacky, rubber-like particles and not in the particular manner in which the materials employed in the combination of the invention are produced. See the book Reclaimed Rubber by John M. Ball, published in 1947 by the Rubber Reclaimers Association. As stated in lines 34 through 37 in column 1 of U.S. Patent No. 2,023,688, it is well known that masticated rubber possesses a greater stickiness or tackiness than rubber obtained directly from rubber latex. However, in spite of all the methods which may be employed to produce tacky rubber particles, it is preferred that rubber be reclaimed as described in the Ball book, "refining" or mashing of rubber particles into a continuous thin sheet being omitted as the last reclaiming step. It is well known that comminuted reclaimed rubber naturally has surfaces that are tacky. That is, the "devulcanization" or reclaiming process employed produces rubber particles having surfaces which are naturally tacky.

The membrane must be employed in the above-described combination because particles would stick to the anatomy and clothes of a child if they were not provided. Furthermore, the particles would tend to move around and be kicked out of any receptacle into which they were put. This would be particularly true if they were employed on a playground under swings and the like. In addition, the membrane distributes forces over a reasonably large area of the particles so that falling on such a cushion would not cause an elbow or knee to sink down into the material within a relatively small isolated area. Still further, if a membrane were not used, children and adults alike would tend to trip over the particles because their feet would sink down relatively deep into the layer of particles as they walked across it.

The above-mentioned and other objects and advantages of the invention will be better understood when considered with the following description taken in connection with the accompanying drawings made a part of this specification, wherein several embodiments are illustrated by way of example. The device of the present invention is by no mean limited to the specific embodiments illustrated in the drawings since they are shown merely for purposes of description.

Figure 1:
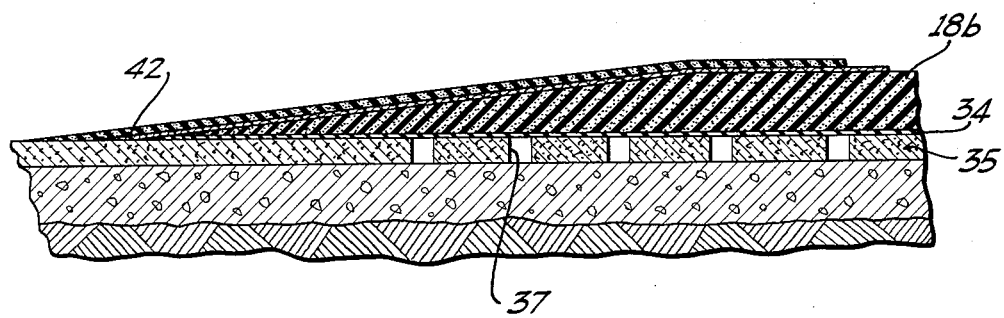
FIG. 1 is a fragmentary vertical sectional view of a shock absorbing structure constructed in accordance with the invention.

In the drawing in FIG. 1, it is shown that the combination of structure of the invention may be employed substantially on a base material, but which base is preferably hard. The material most normally will be located on the ground above which crushed rock or cement will be disposed. Upon the crushed rock, an asphalt-type layer 35 may be disposed as shown in FIG. 1, which may be of any construction, and which may for example have holes 37. On top of the layer 35, an asphalt rock composition surface layer 34 may be laid.

On top of the layer 34, the combination of structures of the invention are laid. These structures are specifically a mass of tacky self-adhering particles 18b and a membrane 42 to cover the mass 18b.

In order for the mass 18b to react appropriately to impact forces, it must contain tacky granules of an elastomeric material such as ground, reclaimed, devulcanized rubber bound together by their own tackiness or processed to be tacky. However, the membrane construction need not be nearly so limited. Specifically, it should be made simply of a strong, preferably open-weave fabric made of cotton, rayon, nylon, spun glass or other threads. Alternatively, it may be similar to that to what is known as "roofer's membrane." The cloth need not be treated with any other material; however, it is preferably impregnated with a wear-resistant coating both to increase its life and to bond it to layer 34 to provide an enclosed space for mass 18b.

The thickness of mass 18b can be varied to suit local conditions and preferences, but normally a three inch thick mass is sufficient. The mass acts to give the requisite shock absorbing quality to the construction as a whole.

Preferably different sized rubber-like particles are incorporated in the mass 18b. Preferably 100% of the particles should pass through a 4-mesh screen and not over 10% through an 8-mesh screen. However, these proportions and sizes are not critical.

The surfaces of the individual tacky, rubber-like particles included in the mass 18b are preferably provided with tacky external surfaces to stick together. The tackiness of their surfaces is always provided by a tacky material, but is preferred that this tacky material be a physical property of their external surfaces after they have been reclaimed and processed for this purpose. They will in this case be bound together only by their own tackiness. Alternatively, they may be bound together by the tackiness of a binder. It is to be noted that in either case the bond between the particles would be a yielding bound in order to produce the controlled resilience effect explained previously. That is, the particles tend to stick together by their own tacky external surfaces or by the tackiness of a binder on their external surfaces, but do not remain in any compressed condition indefinitely after pressure upon the mass is released. Thus, the mass 18b will always recover at least part of its original shape, but will require a substantial amount of time to recover its shape and thereby prevent bodies coming into violent contact with the membrane 42 from being damaged because of rebound.

It is of course necessary to use the membrane over the mass of tacky particles 18b to prevent the particles from sticking to the anatomy and clothes of a child when the shock absorbing structure is used under playground apparatus. Furthermore, the particles tend to be disbursed over a wide area by being kicked out of any receptacle they might be put in if the membrane 42 were not provided. This would be especially true if the shock absorbing structure were employed under swings and the like on a playground. As stated previously, the membrane also distributes force over a reasonably large area on the top of the mass 18b and thereby prevents knees and elbows from sinking down into relatively small areas and thereby makes the shock absorbing structure easier to walk over. Still further, if the membrane 42 were not used, children and adults alike would trip over the particles because their feet would sink down relatively deep into the mass 18b. Thus the structure of the invention is employed to absorb the kinetic energy of a body coming into violent contact with it. The particles of the mass 18b are bound together only by the tackiness at their external surfaces, this tackiness providing a yielding bond between adjacent particles for controlling the resiliency of the whole structure by lengthening the time required for the structure to recover its shape after it is deformed by the impact of a body against it. The individual particles because of their resiliency tend to resume their original form and thereby slowly overcome adhesion to neighboring particles, whereby the whole structure may slowly at least partially recover its shape each time a body falls on top of it without causing the body to rebound. This feature of the invention may be used and has been used to good effect on playgrounds under playground apparatus.

As stated previously, preferably membrane 42 is cemented to layer 34 or to a surface surrounding an area on which the shock absorbing structure of the invention is to be positioned by an impregnating material to provide an enclosed space for mass 18b.

The covering or coating layer which provides the outer wearing surface is preferably composed of rubber, polyethylene or other elastomeric materials dissolved in an appropriate solvent, e.g. benzol or petroleum naphtha, to form a plastic flowable mass in which reinforcing pigments, e.g. carbon black, clay, etc., have been blended and including sulphur, rubber accelerators or similar chemicals that will cause a curing or setting of the composition into a pliable, tough film or sheet. An example follows:

*Coating material*

20 lbs. whole tire reclaimed rubber;
30 lbs. gilsonite;
1 lb. sulphur;
20–30 lbs. mineral spirits to form a thick paste.

The material coated over or impregnating the membrane 42 may be applied in several ways, that is, by spraying, troweling, or the like. Also, it may be applied in one operation or in two separate operations.

Figure 2:
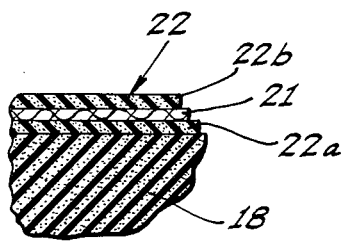
FIGS. 2 and 3 are enlarged fragmentary sectional views of a shock absorbing structure similar to that shown in FIG. 1.

A material to impregnate a membrane 21 is better illustrated at 22a in FIG. 2. In this case, the impregnating material 22a is applied in a thin layer on the upper surface of a mass 18 of tacky rubber-like particles before membrane 21 is laid on top of them. The membrane 21 is then laid and a final coating layer 22b is sprayed or otherwise applied over membrane 21.

Figure 3:
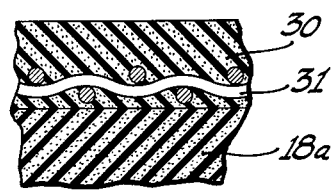

Alternatively it may be desirable to dispense with the first coating step when the membrane 21 is relatively loosely woven or of an open mesh texture. In this case, the membrane may be laid directly over the mass or cushioning body 18 after which the final covering coating layer indicated at 22b may be applied. In this case, the coating 22b may penetrate the membrane 21 to reach the upper particles in the cushioning body 18. This situation is illustrated in FIG. 3 where a mass of tacky rubber-like particles are indicated at 18a which are covered with a membrane 31 that is impregnated with a material 30 that penetrates the membrane 31 to reach the upper particles of the mass 18a and thereby bonds the membrane 31 to the mass or cushioning body 18a.

Figure 4:
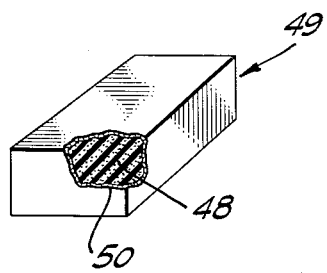
FIG. 4 is a broken away perspective view of a brick or block embodying the shock absorbing structure of the invention.

Alternatively, a membrane 50 may be provided as indicated in FIG. 4 where to completely enclose a mass 48 of tacky rubber-like particles to provide a brick or block. In this case also, the membrane 50 may be impregnated with a wear-resistant coating layer 49.

This application is a continuation of copending application Serial No. 317,338 entitled "Cushioning Structure" and filed October 28, 1952 and now abandoned. The filing date of said copending application is thereby claimed for this application.

Although only a few specific embodiments of the invention have been illustrated and described in this application, it is to be understood that the true scope thereof is not limited thereby but defined only in the appended claims.

What is claimed is:

1. A shock absorbing structure for absorbing the kinetic energy of a body coming into violent contact therewith, said structure comprising: a membrane at least partially defining an enclosed space, and a mass of tacky elastomeric particles in said space, said particles being bound together only by the tackiness at their external surfaces, this tackiness providing a yielding bond between adjacent particles for controlling the resiliency of said structure by lengthening the time required for said structure to recover its shape after having been deformed by the impact of said body thereagainst, the individual particles because of their resiliency tending to resume their original form and thereby slowly overcoming adhesion to neighboring particles, whereby said structure may slowly and at least partially recover its shape without causing said body to rebound.

2. The invention as defined in claim 1, wherein said structure is located over a surface, said membrane being bonded to said surface only at its edges, said membrane otherwise being spaced from said surface and thereby defining said enclosed space therewith.

3. The invention as defined in claim 2, wherein said membrane is shaped to provide said enclosed space by itself.

4. A shock absorbing structure for absorbing the kinetic energy of a body coming into violent contact therewith, said structure comprising: a membrane at least partially defining an enclosed space, and a mass of devulcanized, reclaimed rubber particles in said space, said particles being bound together only by the tacky character of their external surfaces, said tacky character providing a yielding bond between adjacent particles for controlling the resiliency of structure by lengthening the time required for said structure to recover its shape after having been deformed by the impact of said body thereagainst, the individual particles because of their resiliency tending to resume their original form and thereby slowly overcoming adhesion to neighboring particles, whereby said structure may slowly and at least partially recover its shape without causing said body to rebound.

5. The invention as defined in claim 4, wherein said membrane is impregnated with a wear-resistant coating.

References Cited in the file of this patent

UNITED STATES PATENTS

| | | |
|---|---|---|
| 1,597,808 | Lahey | Aug. 31, 1926 |
| 1,898,425 | Cowen et al. | Feb. 21, 1933 |
| 1,949,063 | Merrill | Feb. 27, 1934 |
| 1,980,943 | Patterson | Nov. 13, 1934 |
| 2,023,688 | Lacey | Dec. 10, 1935 |
| 2,147,362 | Bloomberg | Feb. 14, 1939 |
| 2,345,376 | Bodle et al. | Mar. 28, 1944 |
| 2,515,847 | Winkler | July 18, 1950 |
| 2,678,081 | Rainard et al. | May 11, 1954 |